Feb. 24, 1942.  E. G. BIEDERMAN  2,274,122
TRAVELING REPEAT WELDER
Filed Dec. 22, 1939   4 Sheets-Sheet 3
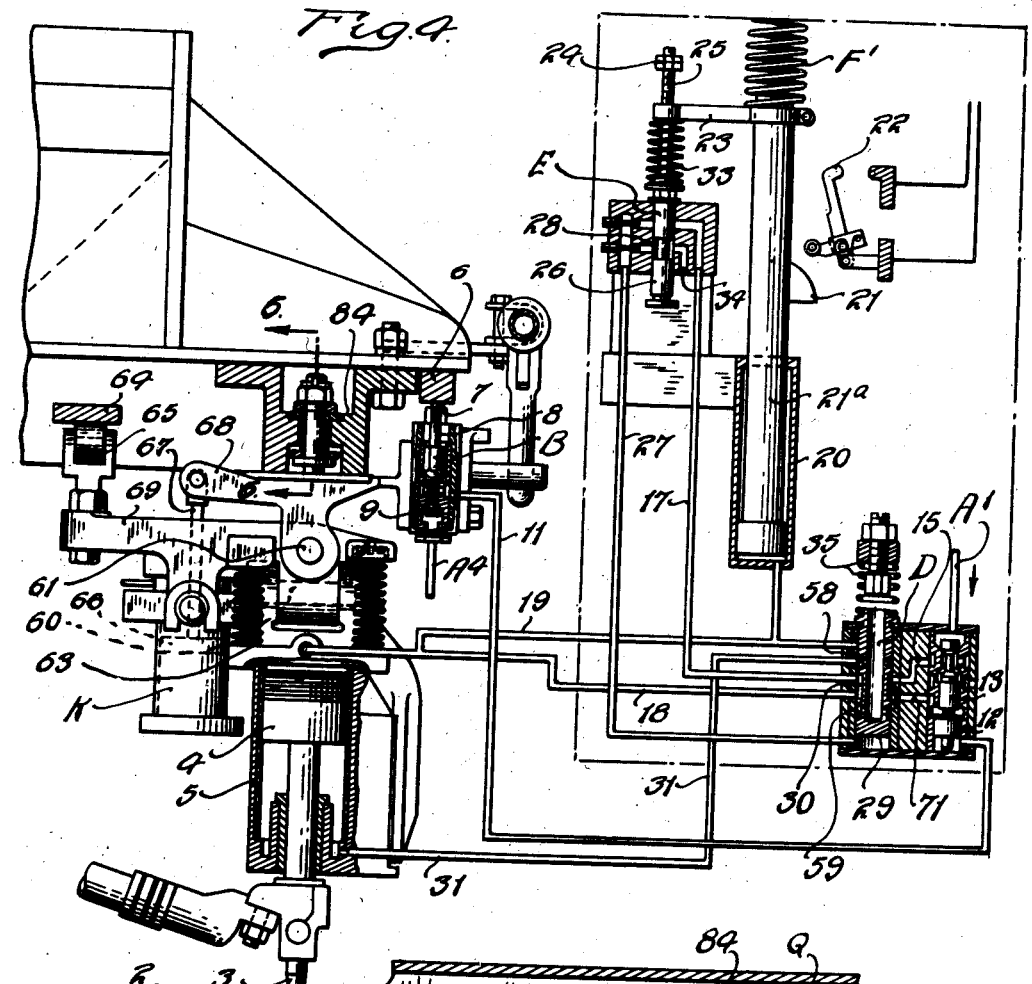
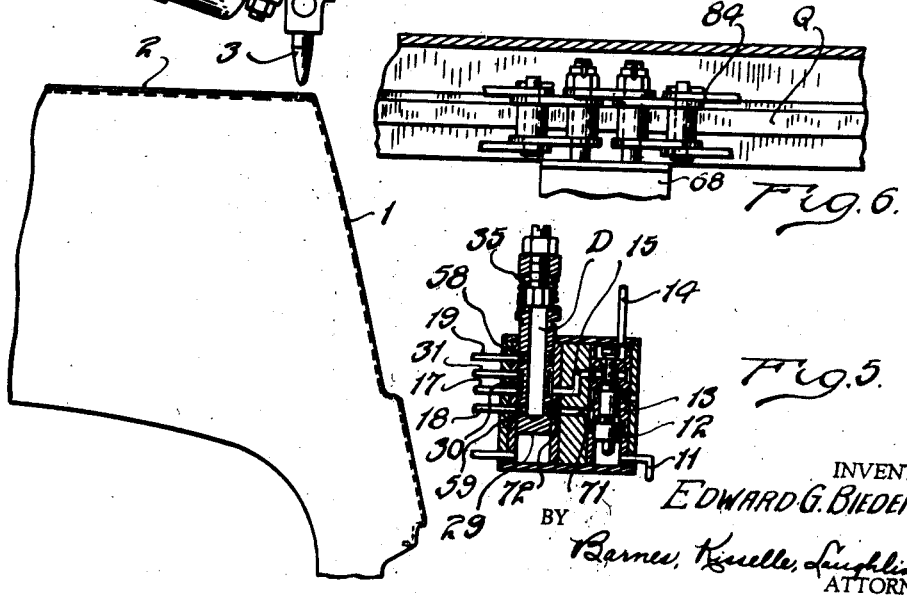
INVENTOR.
EDWARD G. BIEDERMAN
ATTORNEYS

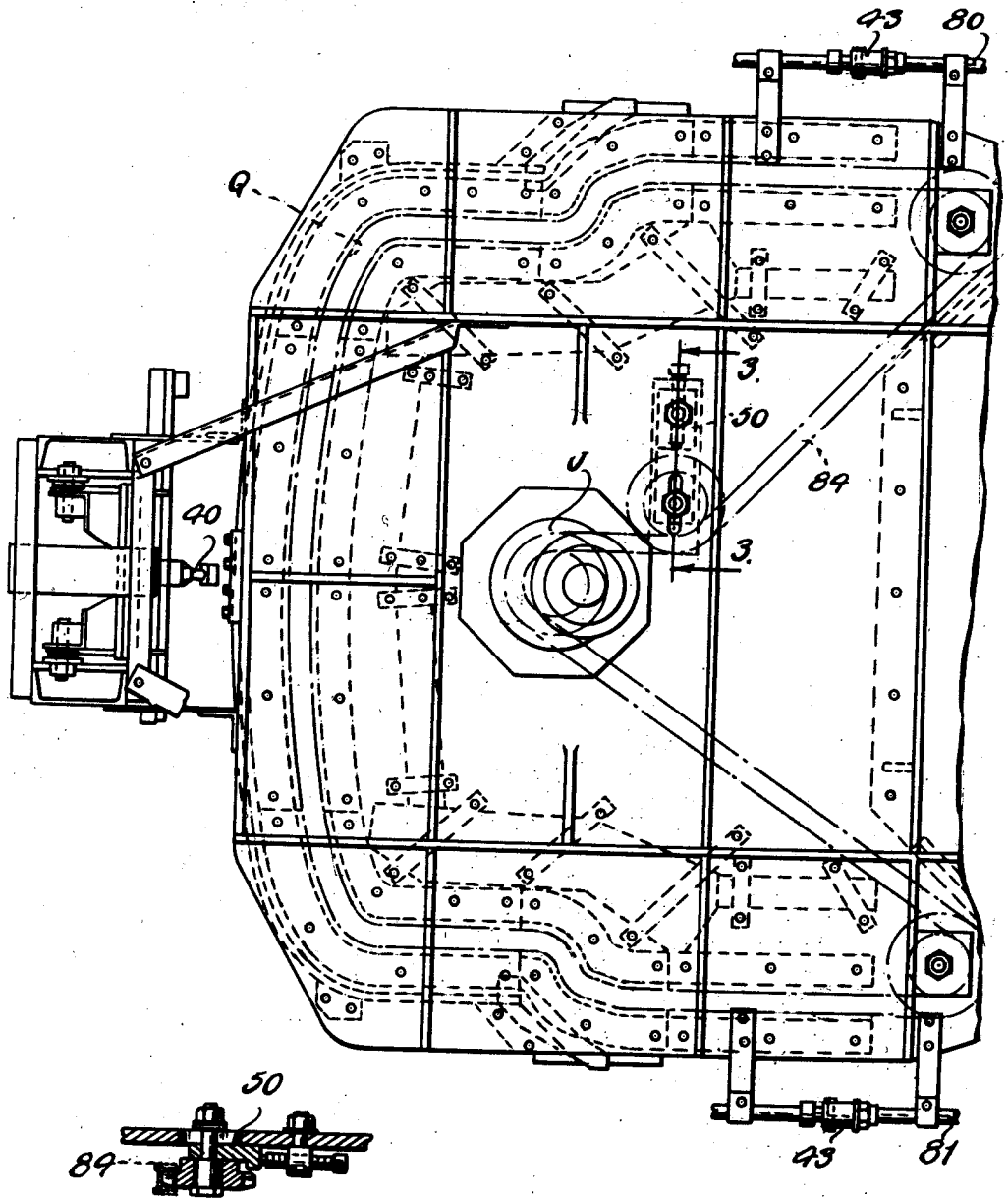

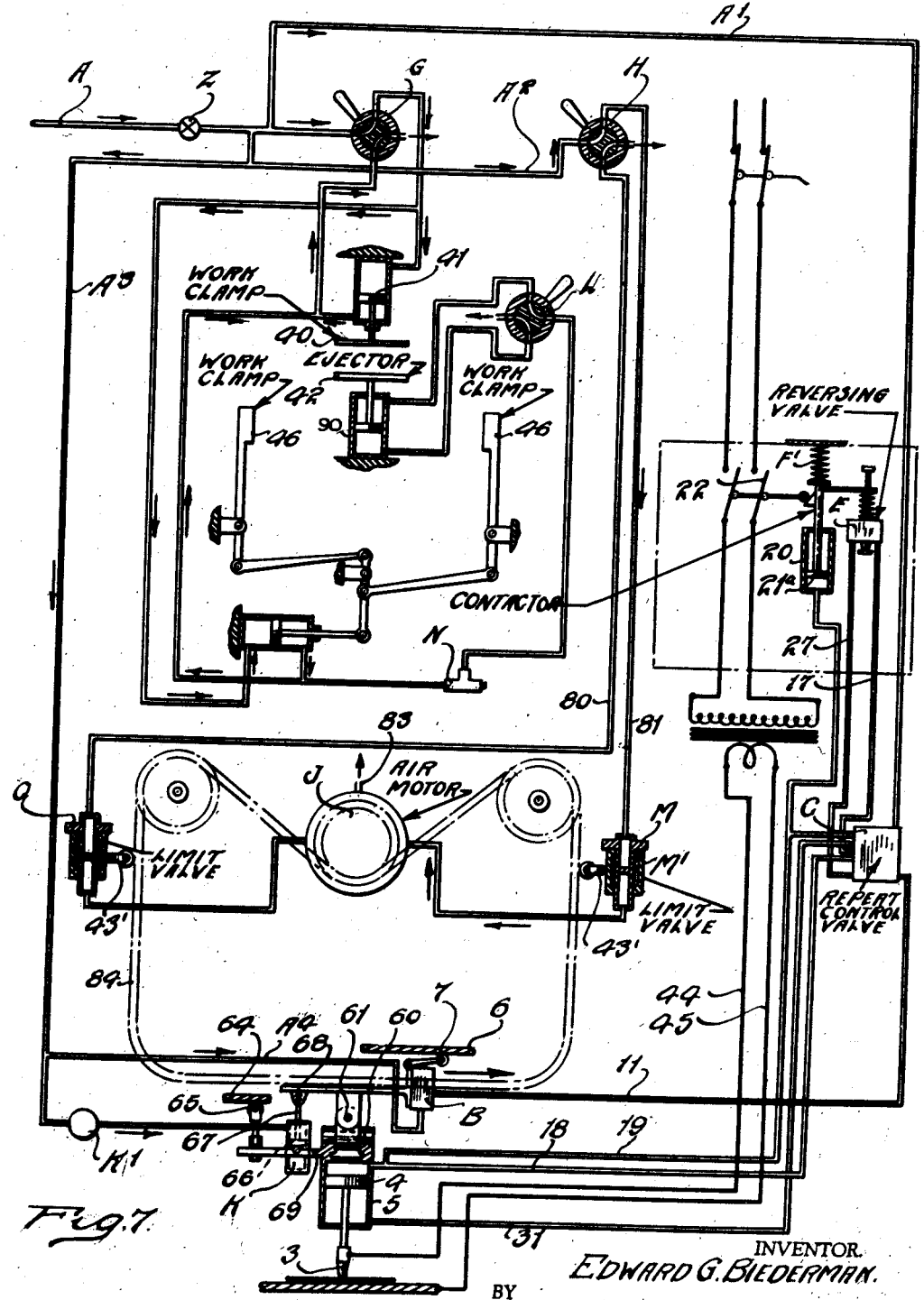

Patented Feb. 24, 1942

2,274,122

UNITED STATES PATENT OFFICE 2,274,122

TRAVELING REPEAT WELDER

Edward G. Biederman, Detroit, Mich., assignor to General Motors Corporation, Detroit, Mich., a corporation of Delaware Application December 22, 1939, Serial No. 310,596

4 Claims. (Cl. 219—4)

This invention relates to a traveling repeat welder. A welder of this kind is described and claimed in the patent of Anton Waeschle and Robert E. Allan, No. 2,197,957, dated April 23, 1940. The present invention is an improvement on the welding apparatus of that application by using a repeat welder which is controlled by an automatic air valve.

It is not broadly new to use an air valve to control a repeat welder. This is described and claimed in the application of John Abplanalp, Serial No. 65,332. But, the present improved apparatus involves the application of an automatic air-controlled repeat welder to a traveling welder in which the apparatus is operated entirely by fluid pressure, save for the energy used in welding.

The welder is caused to travel by means of an air motor and the air motor is controlled by limit air valves. A cam track arrangement is so arranged as to cut off the repeat welder before the limit valve is actuated by the traveling welder to stop the movement of the welder. The holding clamps are operated by air control valves as is also the ejector. Furthermore, the repeat welder is provided with a "non-beat device" which prevents the lifting of the electrodes until after the current has ceased to flow through the same.

In the drawings:

Fig. 2 is a top plan view of part of the apparatus.

Fig. 3 is a sectional detail taken on the line 3—3 of Fig. 2, showing the chain tightener.

Fig. 4 is an enlarged vertical section of the welding tool and the track along which it travels showing also, in vertical section, the electrical timer and the pneumatic repeat control. The repeat weld control valve B is closed.

Fig. 5 is an enlarged view of the air-operated repeat welder control shown in a different position than in Fig. 4 because of the opening of the valve B.

Fig. 6 is a detail of the chain showing the means of fastening the welding head to it.

Fig. 7 is a diagrammatic view of the apparatus.

Figure 1:
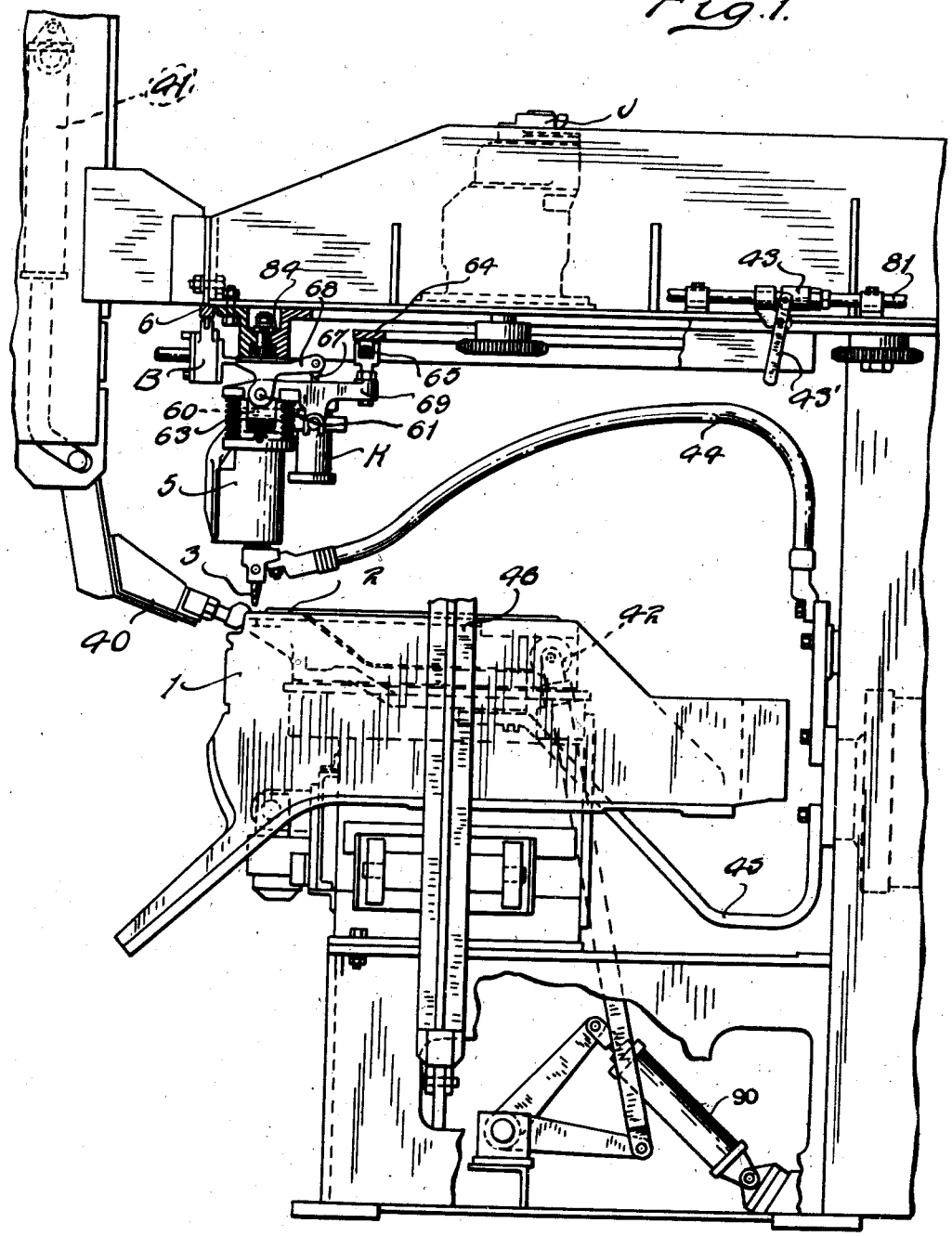
Fig. 1 is a side elevation of the apparatus partly in section.

The work intended to be done on the job shown in the drawings is the welding of a shroud 1 to a shroud pan 2 by spot welding electrode 3. Another use for a machine of this kind is the welding of the wheel-housing of an automobile body to the rear quarter panel. The electrode is reciprocated into and out of contact with the work by the piston 4 in cylinder 5.

In Fig. 7, a diagrammatic view of the unit is shown. Air source A has two unrestricted branches $A^1$ and $A^3$. Air line $A^1$ leads to the repeat control valve 13. Air line $A^3$ through branch $A^4$ leads to poppet valve B. Manual valve Z controls the starting and shutting off of the device. Valve B is an automatic valve for shutting off or cutting in the fluid which operates the repeat weld electrodes and contactor.

An air motor J (Fig. 7) through chain 84 imparts motion to the welding head which travels in a path prescribed by the chain. The track for the chain is shown at Q in Fig. 2 and is somewhat irregular, depending upon the outline of the work. Fig. 3 shows a cross section of chain tightener 50 of Fig. 2. This device provides a means for taking up slack in the chain and also provides a means for quick release of the chain when removal is desired.

In Figs. 4 and 5, the details of the repeat welder are shown. Poppet valve 9 is controlled by roller 7 which engages cam rail 6. By contacting a high cam rail portion poppet valve 9 is depressed; this admits air from air line A, $A^3$, $A^4$ and valve B seals at its base, preventing any exhaust around it. By pipe 11, this air is admitted to the underside of valve 12. Valve 12 is raised by the air pressure and is then in the position shown in Fig. 5. This valve B controls an auxiliary air line and through valve 12 controls the fluid-operated repeat mechanism.

The raising of valve 12 admits air from line A, $A^1$ and allows it to pass through passageway 15 to valve D. Valve D by spring 35 is urged to the position shown in Fig. 4. The charge of air from passageway 15 passes around the annular groove 30 of valve D and into pipes 17 and 18. Pipe 17 at present is blocked by the closed reversing valve E. Pipe 18 carries the air to the top of the welding tool cylinder 5. This air pressure in cylinder 5 forces piston 4 downward to bring the electrode 3 in contact with the work. At this time cylinder 5 is exhausting at the bottom through pipe 31, groove 58 and the central bore of valve D. Pipe 18 has a branch 19 connected to the bottom of contactor cylinder 20. Thus, the air raises contactor piston $21a$ and cam 21 temporarily closes timing switch 22 completing the primary welding circuit. Continued movement of piston $21a$ causes arm 23 to engage the nuts 24 and raise reversing valve E. This connects pressure line 17 to line 27 and cuts off the connection of line 27 with the atmosphere at 34. Air in line 27 raises valve D to the position shown in Fig. 5 by operating upon piston 29. This shifting of valve D opens lines 18 and 19 to the atmosphere through the open center of valve D. Air from line $A^1$ through passage 15 now enters lines 31 and 17 by reason of the annular groove 30 of valve D (see Fig. 5). Air, by line 31, now forces piston 4 upward. Cylinder 5 exhausts through lines 18 and port 59. Line 19 now being opened to the atmosphere through port 58 and central bore of valve D causes cylinder 20 to exhaust. Thus, piston $21a$ is forced down by spring F' and valve E is forced to the position shown in Fig. 4 by spring 33. This cuts off line 17 and exhausts line 27 to the atmosphere through opening 34. The exhausting of line 27 releases the pressure underneath piston 29 and spring 35 returns valve D to the position shown in Fig. 4.

The above operation constitutes one cycle of operation of the repeating mechanism shown and claimed more specifically in the Biederman application, Serial No. 58,916. This cycle will automatically repeat itself making spot welds until roller 7 contacts a low portion of the cam rail. This will close valve 9 and shut off air supply $A^4$. Thus, the air pressure in line 11 is lost and valve 12 returns to the position shown in Fig. 4 by exhausting through pipe 11 and up around the sides of polygonal shaped valve B. If, upon the last spot of a series or a single spot, the valve B should close before the completion of the weld, the machine will automatically complete the weld before poppet valve 13 closes and stops the operation. This is attained by the passage of air from line $A^1$ through passage 15, annular ring 30 and passage 71 into the chamber above valve 12. This pressure keeps poppet valve 13 open. However, when contactor piston $21a$ completes its upward stroke, it connects line 27 to line 17 and allows air to enter the space below valve 29. This will raise valve D to the position of Fig. 5 and cut off passage 71 from passage 15 and now permit poppet valve 13 to close by exhausting the air above valve 12 through passage 71 and port 72 and the central bore of valve D. Delaying this closing of valve 13 until the contactor piston finished its upward stroke permits the welding to be completed. This is a so-called "non-beat" device, one form of which is disclosed and claimed in the Beiderman application, Serial No. 71,705.

In Fig. 1, some additional elements of the unit are shown. A clamp 40 to hold the work in place is operated by air cylinder 41. Numeral 46 designates one of a pair of clamps better shown in Fig. 7. An ejector 42 is shown operated through levers from cylinder 90. The numeral 43 designates one of a pair of valves (see Fig. 2) which limit the motion of the welding head. Cables 44 and 45 connect with the secondary winding of a transformer.

Referring to Fig. 4, it may be observed that the welding head is mounted upon two axes 60 and 61 at right angles to each other and in different planes, thus affording a universal movement. Axis 60 permits the welding head to rotate in the plane of travel of the welding head. Springs 63 urge the welding head to assume a position normal to the work. Axis 61 permits the welding head to rotate in a plane at right angles to the path of motion of the head at that time.

The chain is in constant motion but the welding electrode must temporarily remain at the spot of welding. This is permitted by the axis 60. Any slight lengthening of the welding head necessary to permit the electrode to remain in contact with the work while the chain moves on is permitted by downward motion of piston 4 in cylinder 5 caused by air pressure from line 18 of Fig. 4 as previously explained.

Means are provided to yieldingly urge the welding head into a vertical position to restore it after it has dragged behind or has been deflected at a corner. To this end, flat track 64 and roller 65 are provided. Air cylinder K urges the roller 65 to contact the track 64. Reducing valve K' in the air line to cylinder K keeps the air in the cylinder under constant pressure. If it is desired to swing the electrode out of line, suitable high portions may be provided on rail 64, thus swinging electrode 3 about axis 61. But, in this particular shroud and pan welding machine, it is not desired to positively swing the electrode to the side of its normal path so the track 64 is flat. Cylinder K moves with the welding head.

Piston 66 in cylinder K (Fig. 7) is rigidly fastened by piston rod 67 to the top 68 of the welding head. Cylinder K is pivotally fastened by lever 69 to the welding head and roller 65. Air pressure above piston 66 will urge cylinder K upward and this will urge roller 65 in contact with track 64 and urge the welding head to a vertical position against any deflection of electrode 3 to the right in Fig. 4.

Fig. 7 is a diagrammatic view of the entire apparatus. Assuming master valve Z to be open, air may always reach valve B through lines A, $A^3$ and $A^4$. Air may also pass through lines A and $A^1$ to valve C. A continuous air source (lines A and $A^1$) reaches hand operated four-way control valve H which controls air motor J. This air motor J through the chain 84 moves the welding head in its track as previously described. Air motor J is reversible. It is provided with alternate air circuits, the use of which determines the direction of travel of the welding head. Air source lines 80 and 81 will be used at alternate times. A common exhaust 83 from the air motor J permits this. Valves M and O are in the air lines to the air motor. These valves are operated by contact of the welding head with lever 43 (Fig. 1) at the end of its travel. When either valve arm 43 is contacted, sleeve M' is moved to closed position cutting off the air supply to the motor. When motion of the welding head is next desired, shifting of valve H will cause the air to pass through the alternate feed line, through motor J and exhaust at 83. This will set the welding head in motion in the opposite direction. Valve arm 43 will be released and the limit valve will return to its normal open position.

With the units as positioned in Fig. 7, the work is clamped in position and the welding head is moving in a counterclockwise direction. The welding head in Fig. 7 has been turned 90-degrees towards the observer for purposes of illustration. Four-way manual control valve G controls the clamping means and at the same time is a safety control of the ejector. Manual valve L directly controls the ejector 42. In its Fig. 7 position, valve G permits air from line A to actuate the work clamps 40 and 46. The roller on valve B is contacting a high portion of the cam with valve B open and electrode 3 in welding contact with the work. As illustrated in Fig. 4, the ejector is in retracted position. Just before the welding head contacts lever 43 of valve M, the roller on traveling poppet valve B will strike a low portion of the cam. This will close valve B and stop the welding apparatus after the one last weld is completed. Contact of the welding head with lever 43' of valve M stops the motor and hence the travel of the welding head. Manual valve G is then reversed. This will unclamp the work but not affect the ejector. Next, manual valve L is reversed, this will actuate the ejector. If, by mistake, valve L is operated before valve G, no harm will be done for the ejector will not be actuated for it is then still on the exhaust side of valve G as long as the work is clamped. By-pass valve N in the air line to the ejector retards the operation of the ejector to assure that the work is completely unclamped before it operates.

When a new piece of work is clamped in position, valve H is reversed. This will put motor J in reverse and cause the welding head to move in its track in a clockwise direction until it reaches its other extreme at valve O. Contact of the roller on valve B with the high cam portions will repeat the welding operation.

What I claim is:

1. In a repeat welding apparatus, the combination of an electrode, a piston connected to the electrode, a cylinder in which the piston reciprocates, means for automatically controlling the supply of fluid to the piston to cause continuous reciprocation of the piston, means for causing the cylinder to travel in a prescribed path, a suspension means for said cylinder, said suspension means having right angularly placed pivots permitting the cylinder to swing in two planes at right angles to each other, means for causing said cylinder and electrode to swing crosswise the path of travel and springs for tending to center the cylinder in its normal position.

2. In a repeat welding apparatus, the combination of an electrode, a piston connected to the electrode, a cylinder in which the piston reciprocates, means for automatically controlling the supply of fluid to the piston to cause continuous reciprocation of the piston, means for causing the cylinder to travel in a prescribed path, a suspension means for said cylinder, said suspension means having right angularly placed pivot pins permitting the cylinder to swing in two planes at right angles to each other and springs yieldingly urging the cylinder into vertical position but permitting swinging of the cylinder and electrode in the plane of the path of travel of the cylinder to permit the electrode to drag behind momentarily during the welding operation but to return to normal position after the electrode is released from the work.

3. In a repeat welding apparatus, the combination of an electrode, a piston connected to the electrode, a cylinder in which the piston reciprocates, means for automatically controlling the supply of fluid to the piston to cause continuous reciprocation of the piston, means for causing the cylinder to travel in a prescribed path, a suspension means for said cylinder, said suspension means having right angularly placed pivot pins permitting the cylinder to swing in two planes at right angles to each other, springs yieldingly urging the cylinder into vertical position but permitting swinging of the cylinder and electrode in the plane of the path of travel of the cylinder to permit the electrode to drag behind momentarily during the welding operation but to return to normal position after the electrode is released from the work, a track, a roller and an arm for governing the swinging movement of the cylinder in a plane at right angles to the plane of travel of the cylinder.

4. In a repeat welding apparatus, the combination of an electrode, a piston connected to the electrode, a cylinder in which the piston reciprocates, means for automatically controlling the supply of fluid to the piston to cause continuous reciprocation of the piston, means for causing the cylinder to travel in a prescribed path, a suspension means for said cylinder, said suspension means having right angularly placed pivot pins permitting the cylinder to swing in two planes at right angles to each other, springs yieldingly urging the cylinder into vertical position but permitting swinging of the cylinder and electrode in the plane of the path of travel of the cylinder to permit the electrode to drag behind momentarily during the welding operation but to return to normal position after the electrode is released from the work, a track, a roller, an arm for governing the swinging movement of the cylinder in a plane at right angles to the plane of travel of the cylinder and a fluid pressure cylinder and piston cooperating with said arm and roller to keep the roller in contact with said track.

EDWARD G. BIEDERMAN.